United States Patent
Matsuyuki et al.

(10) Patent No.: US 11,604,514 B2
(45) Date of Patent: Mar. 14, 2023

(54) SUBSTRATE HAVING A VISUALLY IMPERCEPTIBLE TEXTURE FOR PROVIDING VARIABLE COEFFICIENTS OF FRICTION BETWEEN OBJECTS

(71) Applicant: Apple Inc., Cupertino, CA (US)

(72) Inventors: Naoto Matsuyuki, Tokyo (JP); Dale N. Memering, Cupertino, CA (US); Matthew S. Rogers, Cupertino, CA (US); Victor Luzzato, Cupertino, CA (US); Naoki Okahata, Tokyo (JP)

(73) Assignee: APPLE INC., Cupertino, CA (US)

( * ) Notice: Subject to any disclaimer, the term of this patent is extended or adjusted under 35 U.S.C. 154(b) by 432 days.

(21) Appl. No.: 15/098,836

(22) Filed: Apr. 14, 2016

(65) Prior Publication Data
US 2017/0300114 A1 Oct. 19, 2017

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01); *G06F 2203/04103* (2013.01); *G06F 2203/04809* (2013.01)

(58) Field of Classification Search
CPC ...................... G06F 3/016; G06F 3/041; G06F 2203/04103; G06F 2203/04809
See application file for complete search history.

(56) References Cited

U.S. PATENT DOCUMENTS

| | | | |
|---|---|---|---|
| 4,764,491 A | 8/1988 | Quadir | |
| 4,833,001 A | 5/1989 | Kijima et al. | |
| 4,857,093 A | 8/1989 | Prewo et al. | |
| 6,133,181 A | 10/2000 | Wentworth et al. | |
| 6,677,703 B2 | 1/2004 | Ito et al. | |
| 6,741,307 B2 | 5/2004 | Matsunaga et al. | |
| 8,076,011 B2 | 12/2011 | Chiang et al. | |
| 8,251,210 B2 | 8/2012 | Schmidt et al. | |
| 8,298,975 B2 | 10/2012 | Hasegawa et al. | |
| 8,322,560 B2 | 12/2012 | Jiang et al. | |
| 8,394,167 B2 | 3/2013 | Merkel et al. | |
| 8,442,604 B1 | 5/2013 | Diebel | |

(Continued)

FOREIGN PATENT DOCUMENTS

| | | |
|---|---|---|
| CN | 1242685 | 1/2000 |
| CN | 2922311 | 7/2007 |

(Continued)

OTHER PUBLICATIONS

Siqueira et al., "Poly(borosiloxanes) as Precursors for Carbon Fiber Ceramic Matrix Composites," http://www.scielo.br/scielo.php?script=sci_arttext&pid=S1516-14392007000200009, Materials Research, vol. 10, No. 2, São Carlos, Apr./Jun. 2007.

(Continued)

*Primary Examiner* — Brian Handville
(74) *Attorney, Agent, or Firm* — Brownstein Hyatt Farber Schreck, LLP

(57) ABSTRACT

Disclosed herein is a substrate for an electronic device. The substrate has a visually imperceptible surface texture that exhibits different coefficients of friction on various input objects. In some implementations, the texture of the textured substrate is created using a gas etching process.

20 Claims, 5 Drawing Sheets

(56) References Cited

U.S. PATENT DOCUMENTS

| | | |
|---|---|---|
| 8,525,778 B2 | 9/2013 | Colgate et al. |
| 8,563,644 B2 | 10/2013 | Imada et al. |
| 8,781,109 B2 | 7/2014 | Hong |
| 9,007,747 B2 | 4/2015 | Gandhi |
| 9,011,997 B2 | 4/2015 | Weber |
| 9,516,150 B2 | 12/2016 | Jeon et al. |
| 2002/0142133 A1 | 10/2002 | Matsunaga et al. |
| 2007/0104896 A1 | 5/2007 | Matsunaga et al. |
| 2009/0197048 A1 | 8/2009 | Amin et al. |
| 2010/0003479 A1 | 1/2010 | Hwang et al. |
| 2010/0028600 A1 | 2/2010 | Kojima et al. |
| 2011/0109568 A1* | 5/2011 | Wu ............... G06F 3/0412 345/173 |
| 2011/0248916 A1 | 10/2011 | Griffin et al. |
| 2012/0268412 A1 | 10/2012 | Cruz-Hernandez et al. |
| 2013/0108813 A1 | 5/2013 | Zhu |
| 2013/0209737 A1* | 8/2013 | Ogumi ............... G02B 1/10 428/143 |
| 2013/0224454 A1 | 8/2013 | Jung et al. |
| 2013/0316116 A1 | 11/2013 | Adams et al. |
| 2014/0178642 A1 | 6/2014 | Milanovska et al. |
| 2015/0010721 A1 | 1/2015 | Tanida et al. |
| 2015/0015808 A1 | 1/2015 | Rasmussen |
| 2015/0050968 A1 | 2/2015 | Jeon et al. |
| 2015/0246459 A1 | 9/2015 | Dorn et al. |
| 2016/0089811 A1 | 3/2016 | Matsuyuki et al. |
| 2016/0090326 A1 | 3/2016 | Matsuyuki et al. |
| 2016/0255929 A1 | 9/2016 | Nazzaro et al. |
| 2016/0347674 A1 | 12/2016 | Meschke et al. |
| 2017/0075039 A1 | 3/2017 | Hart et al. |
| 2017/0088473 A1 | 3/2017 | Wilson et al. |
| 2017/0361067 A1 | 12/2017 | Nazzaro et al. |
| 2018/0063975 A1 | 3/2018 | Ely et al. |
| 2018/0070463 A1 | 3/2018 | Ely et al. |
| 2018/0079686 A1 | 3/2018 | Matsuyuki et al. |
| 2022/0256720 A1 | 8/2022 | Takagi |

FOREIGN PATENT DOCUMENTS

| | | |
|---|---|---|
| CN | 201248054 | 5/2009 |
| CN | 102256457 | 11/2011 |
| CN | 104253884 | 12/2014 |
| CN | 105622096 | 6/2016 |
| EP | 0826645 | 3/1998 |
| EP | 1857428 | 11/2007 |
| EP | 2243756 | 10/2010 |
| EP | 2266934 | 12/2010 |
| TW | M300407 | 11/2006 |
| TW | 200909174 | 3/2009 |
| WO | WO2014012003 | 1/2014 |
| WO | WO 16/043378 | 3/2016 |

OTHER PUBLICATIONS

U.S. Appl. No. 15/614,747, filed Jun. 6, 2017, Matsuyuki et al.
U.S. Appl. No. 15/611,329, filed Jun. 1, 2017, Ely et al.
U.S. Appl. No. 15/371,121, filed Dec. 6, 2016, Ely et al.

* cited by examiner

SUBSTRATE HAVING A VISUALLY IMPERCEPTIBLE TEXTURE FOR PROVIDING VARIABLE COEFFICIENTS OF FRICTION BETWEEN OBJECTS

FIELD

The described embodiments relate generally to a textured substrate. More specifically, the embodiments described herein are directed to a substrate having a visually imperceptible texture that provides tactile sensations varying with an object contacting the surface. The visually imperceptible texture also provides different coefficients of friction between the substrate and the different objects.

BACKGROUND

Many electronic devices use an optically clear substrate, such as glass, sapphire or plastic, as a protective cover for a display device, a portion of a device housing, a camera lens or cover, and so on. These optically clear substrates are processed or otherwise manufactured to have a particular type of surface finish.

For example, a matte surface finish diffuses ambient light. However, the brightness, contrast and/or other characteristic of the image output by the display device may be negatively affected by such a surface finish. In another example, the optically clear substrate may have a glossy surface finish. While this surface finish may not diffuse light like the matte surface finish, it may be highly reflective. As such, ambient light may be reflected back to the user.

SUMMARY

Disclosed herein is a substrate having a textured surface (hereinafter referred to as the "textured substrate"). The texture of the textured substrate is visually imperceptible. As such, the textured substrate may be used as a protective cover for a display device of an electronic device without negatively affecting the quality of the images that are output on the display device. In addition to being visually imperceptible, the texture on the textured substrate provides different tactile sensations to a user depending on the type of object that is placed on or otherwise contacts the textured substrate.

More specifically, and as will be described in more detail below, the textured substrate may be used as a component of a touch interface of an electronic device. The textured substrate has a visually imperceptible roughness that exhibits a first coefficient of friction when a first object moves across a surface of the textured substrate and a second coefficient of friction when a second object moves across the surface of the textured substrate. The second coefficient of friction is different from the first coefficient of friction.

Also disclosed is a substrate for a touch input surface of an electronic device. The etched surface comprises a plurality of peaks and a plurality of valleys. A mean roughness depth between respective ones of the plurality of peaks and respective ones of the plurality of valleys is in a range of approximately 50 nm to approximately 170 nm.

The present application also discloses a substrate comprising a texture pattern on an exposed surface. The texture pattern comprises a root means square roughness in a range of approximately 4 nm to approximately 20 nm and a mean roughness depth in a range of approximately 50 nm to approximately 170 nm.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
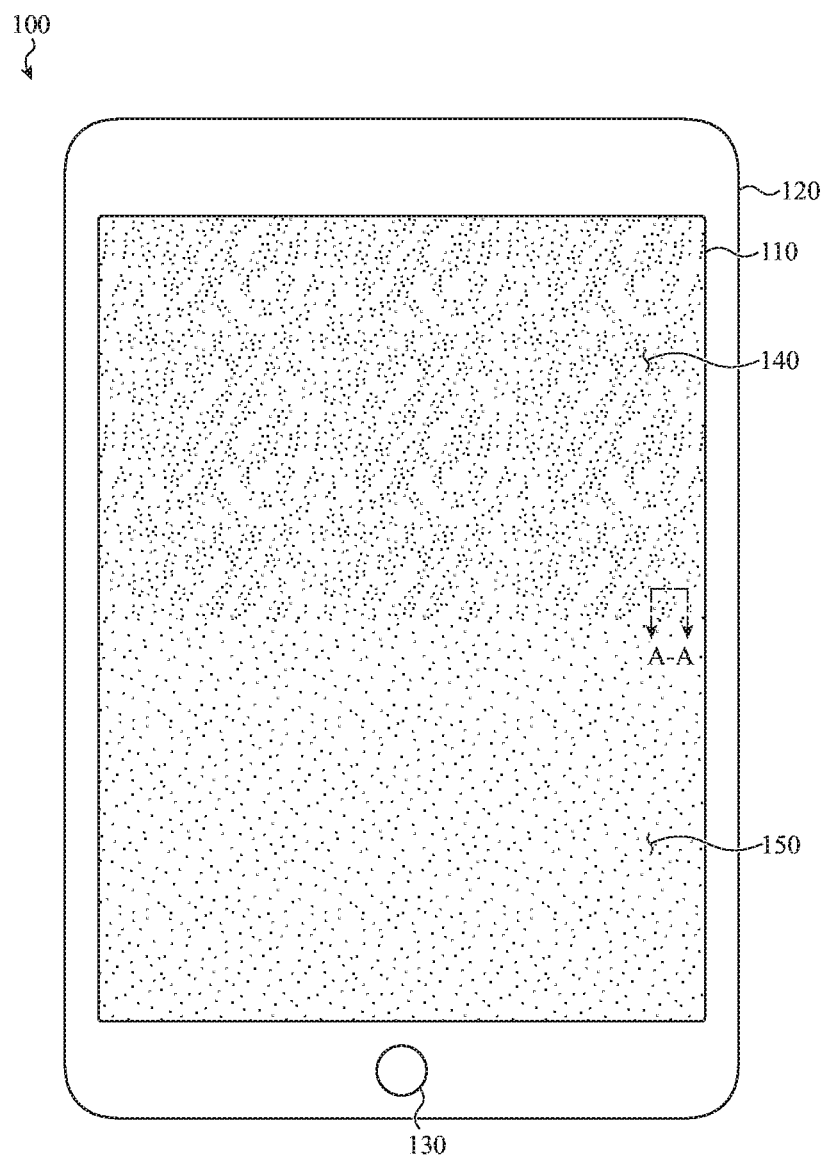
FIG. 1A illustrates an example electronic device having a textured substrate as described herein.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure is directed to a textured substrate. The textured substrate may be glass, sapphire, plastic, or any other substantially transparent, translucent, or substantially opaque material. In other implementations, the textured substrate may be a metal material or alloy such as, for example, iron, gold, silver, copper, aluminum, brass, steel, and so on.

The textured substrate may be used in an electronic device, a mechanical device, an electro-mechanical device, and so on. For example, the textured substrate may be substantially transparent glass or sapphire that is used as a protective cover for a display of an electronic device. Although a specific example has been given, the textured substrate may be used in a variety of ways. For example, the textured substrate may be used as a window, a mirror, a cover for a table, a cover for a picture frame and so on. In other examples, the textured substrate may be aluminum that is used as a housing, a shell, or a protective surface for a device (electronical, mechanical or otherwise) or object.

In the embodiments described herein, the texture of the textured substrate is visibly imperceptible. As used herein, the term "visually imperceptible" means unable to be seen by the unaided human eye. Although the texture is visibly imperceptible, the texture provides different tactile sensations to a user.

For example, in some implementations, the textured substrate may be used as an input surface for a touch input surface or region, or any part of an electronic device that can be touched. When a user's finger contacts and/or moves across the textured substrate, the user may perceive a first tactile sensation (e.g., the textured substrate may feel smooth). However, if an input mechanism contacts and/or moves across the textured substrate, the user may perceive a second tactile sensation (e.g., the textured substrate may feel rough, coarse, tacky, have a higher coefficient of friction when compared to the first tactile sensation, or otherwise feel like a different material).

In some cases, the difference between the tactile sensations may be due to the differing surface areas between the user's finger and the input mechanism. For example, the portion of the input mechanism that contacts the textured substrate may have a small surface area while the portion of the user's finger that contacts the textured substrate may have a larger surface area.

The smaller contact surface area of the input mechanism causes it to interact with the various peaks and valleys that make up the texture in a granular manner. For example, as the input mechanism moves across the surface of the textured substrate, it may travel over various peaks and may at least partially enter various valleys that make up the texture. Each time the input mechanism interacts with the peaks and valleys, a tactile sensation is perceived by the user. Therefore, the user may perceive that the textured substrate is rough, tacky, has a higher coefficient of friction or that the input mechanism experiences an increased drag.

Conversely, the larger contact surface area of the user's finger does not allow for such a granular interaction. For example, the user's finger may contact multiple peaks of the texture but may be too large to interact with (e.g., at least partially enter) the valleys of the texture. As such, the user may perceive that the texture is smooth as she drags her finger over the textured substrate.

The textured substrate is described as having "peaks" and "valleys." As used, herein, the term "peak" means a high point or portion of the substrate. The term "valley" means a low point or portion of the substrate. As such, peaks and valleys may be adjacent one another. In addition, the various peaks and valleys may have different heights and depths. For example, one peak may have first height while a second peak has a second, different height. Likewise, a first valley may have a first depth while a second valley has a second, different depth.

Although the textured substrate is described as having peaks and valleys, the texture is visibly imperceptible. In addition, the texture has a relatively low haze. As used herein, the term "haze" refers to an amount of visible light that is scattered upon passing through the substrate.

If a substrate has a high haze, the substrate may negatively affect the quality of an image that is viewed or otherwise displayed through the substrate. Accordingly, the textured substrate described herein has a relatively low haze. In order to produce a textured substrate with a relatively low haze, the substrate undergoes an etching process.

As will be explained in detail below, gas may be used to etch the substrate. The gas etching process causes the features of the texture to be smaller when compared with features that are created using other etching processes such as, for example, a liquid etching process. As such, the texture may be visually imperceptible and have relatively low haze. Although a gas etching process is specifically discussed, the gas etching process may use a gas or a vapor. As such, the gas etching process described herein encompasses a vapor etching process. In the embodiments described herein, hydrogen fluoride gas may be used in the gas etching process to create the texture on the substrate.

These and other embodiments are discussed below with reference to FIGS. 1A-4. However, those skilled in the art will readily appreciate that the detailed description given herein with respect to these Figures is for explanatory purposes only and should not be construed as limiting.

FIG. 1A illustrates an example electronic device 100 that may use or incorporate a textured substrate 110. In the embodiment shown in FIG. 1A, the electronic device 100 is a tablet computing device. In such an embodiment, the textured substrate 110 of the electronic device 100 may be surrounded by, partially surrounded by, or contained within a housing 120. The textured substrate 110 may function as a protective cover for a display of the electronic device 100. The textured substrate 110 may include an anti-reflective coating and/or an anti-smudge coating (e.g., an oleophobic coating), although such coatings are not required.

The display of the electronic device 100 may function as both an input device and an output device. For example, the display may output images, graphics, text, and the like to a user. The display may act as a touch input device that detects and measures a location of touch input on the textured substrate 110. The electronic device 100 may also include one or more force sensors that detect and/or measure an amount of force exerted on the textured substrate 110.

The electronic device 100 may also include an input component 130. The input component 130 enables a user to provide additional input to the electronic device 100. The input component 130 may be a button, a switch, a dial, a key, and so on. In some implementations, the textured substrate 110 may cover the input component 130.

The texture of the textured substrate 110 may consist of a pattern of peaks and valleys. In some embodiments, the pattern of peaks and valleys is random or semi-random but still feels consistent across the surface.

The peaks and valleys constitute a roughness of the texture. The roughness of the texture may be correlated to a sensation that is felt or perceived by a user as the user contacts or touches the textured substrate 110.

The user typically directly contacts the textured substrate 110. For example, the user may physically touch or press the textured substrate 110 and/or move her finger across the textured substrate 110 to provide input to the electronic device 100.

The contact between the user and the textured substrate 110 may alternatively be indirect contact. For example, the user may use an input mechanism to touch or press the textured substrate 110 and/or may move the input mechanism across the textured substrate 110 to provide input to the electronic device 100. In some embodiments, the input mechanism is a mechanical input mechanism, such as, for example, a stylus.

The roughness of the textured substrate 110 may be expressed as an average roughness (Ra). For example, and referring to FIG. 2, the texture 200 on a substrate, such as, for example, textured substrate 110, may have various peaks 210 and valleys 220. The average roughness of the texture 200 is calculated by measuring an average height between the peaks 210 and the valleys 220 of the surface texture from a mean line 230 measured within a sampling length 240. In some embodiments, the roughness of the textured substrate 110 is approximately 3 nm to approximately 15 nm, although other values may be used.

The roughness of the textured substrate 110 may also be expressed as a root means square roughness (Rq). Referring back to FIG. 2, the root means square roughness of the texture 200 is the root means square of the average height between the peaks 210 and the valleys 220 of the surface texture from a mean line 230 measured within a sampling length 240. In the embodiments described herein, the root means square roughness of the textured substrate 110 is approximately 4 nm to approximately 20 nm, although other values may be used.

In still other embodiments, the roughness of the textured substrate 110 may be expressed as the mean roughness depth (Rz). Referring again to FIG. 2, the mean roughness depth of the texture 200 is calculated by determining the mean value of the depths between the peaks 210 to the valleys 220 within a sampling length 240. In the embodiments described herein, the mean roughness depth of the textured substrate 110 is approximately 50 nm to approximately 170 nm, although other values may be used.

Figure 2:
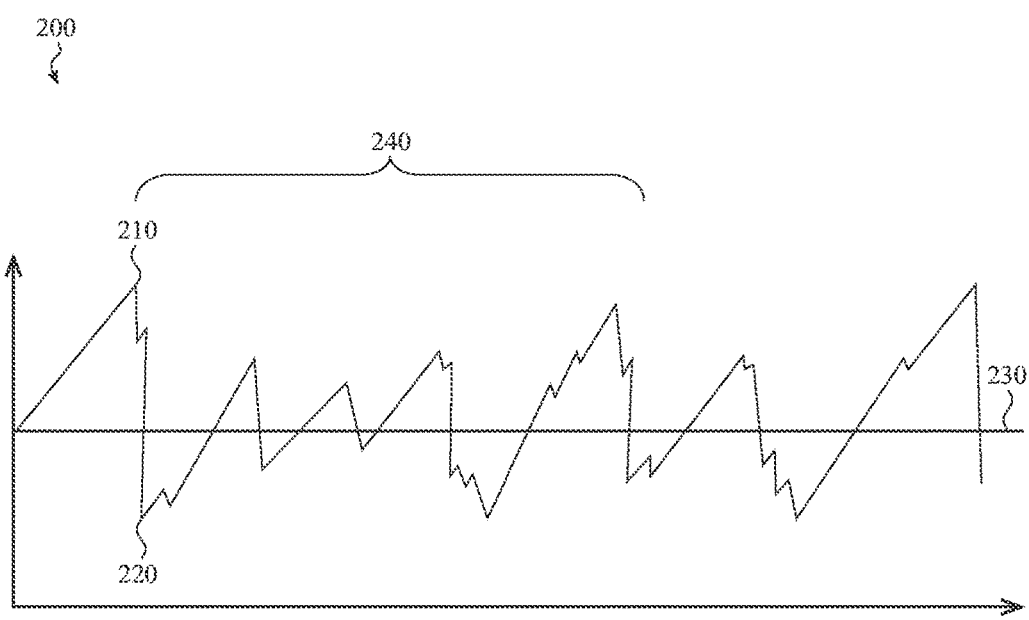
FIG. 2 illustrates an example texture having various peaks and valleys.

Each of the above values may be used individually or collectively to define a roughness of the textured substrate 110. Although FIG. 2 shows a texture 200 having peaks 210, valleys 220, a mean line 230 and a sampling length 240, this is for illustrative purposes only and is not necessarily to scale.

In some embodiments, the textured substrate 110 may be divided into different regions or portions. Each region may have a randomized texture pattern that constitutes a roughness. For example, and as shown in FIG. 1A, a first region or portion of the textured substrate 110 may have a first texture pattern 140 that constitutes a first roughness, and a second region or portion of the textured substrate 110 may have a second texture pattern 150 that constitutes a second roughness. As such, the first texture pattern 140 may have a first set of Ra, Rz, and/or Rq values and the second texture pattern 150 may a second, different set of Ra, Rz, and/or Rq values.

Because the first texture pattern 140 has a different roughness than the second texture pattern 150, each texture pattern may provide different tactile sensations to the user (e.g., each texture will feel different to the user). For example, when the user directly contacts (e.g., with a finger) the first texture pattern 140, the user will perceive a first tactile sensation. When the user directly contacts the second texture pattern 150, the user will perceive a second tactile sensation that is different from the first tactile sensation. Although different tactile sensations may be perceived by the user, each of the first texture pattern 140 and the second texture pattern are visually imperceptible. Thus, the textured substrate 110 will not have any visual differences between the portions of the textured substrate 110.

In addition to the above, each of the different texture patterns may have different tactile sensations when the user indirectly contacts (e.g., with a mechanical input device or other such input mechanism) the first texture pattern 140 and the second texture pattern 150. For example, when the mechanical input device contacts or otherwise moves across the first texture pattern 140, the user may perceive a third tactile sensation. Likewise, when the user indirectly contacts the second texture pattern 150, the user will perceive a fourth tactile sensation.

Each of the regions of the textured substrate 110 may be used for specific, yet different, purposes. For example, the region with the first texture pattern 140 may cause the input mechanism to experience a first amount of drag as it moves across the textured substrate 110. Likewise, the region with the second texture pattern 150 may cause the input mechanism to experience a second amount of drag as it moves across the textured substrate 110. Accordingly, the first region may be conducive to writing with the input mechanism while the second region may be conducive to drawing with the input mechanism.

In another embodiment, one region may be primarily configured to receive direct contact while another region may be configured for indirect contact. For example, a first region having a first texture may be used when the a finger is contacting the textured substrate 110 while a second region having a second texture may be used when an input mechanism is contacting the textured substrate 110.

In some embodiments, the textured substrate 110 may be divided into regions such that a first region of the textured substrate 110 has the first texture pattern 140 (or the second texture pattern 150) and a second region of the textured substrate 110 lacks any such texture pattern (e.g., is smooth, untextured, or the like). In still other implementations, the textured substrate 110 may have alternating regions of texture patterns and/or alternating regions of texture patterns and regions without a texture pattern.

Although specific examples are given, they are illustrative only. Additionally, although FIG. 1A shows the first texture pattern 140 and the second texture pattern 150 on the surface of the textured substrate 110, such patterns are used to illustrate the different textures. As described herein, each of the first texture pattern 140 and the second texture pattern 150 are visually imperceptible.

Figure 1B:
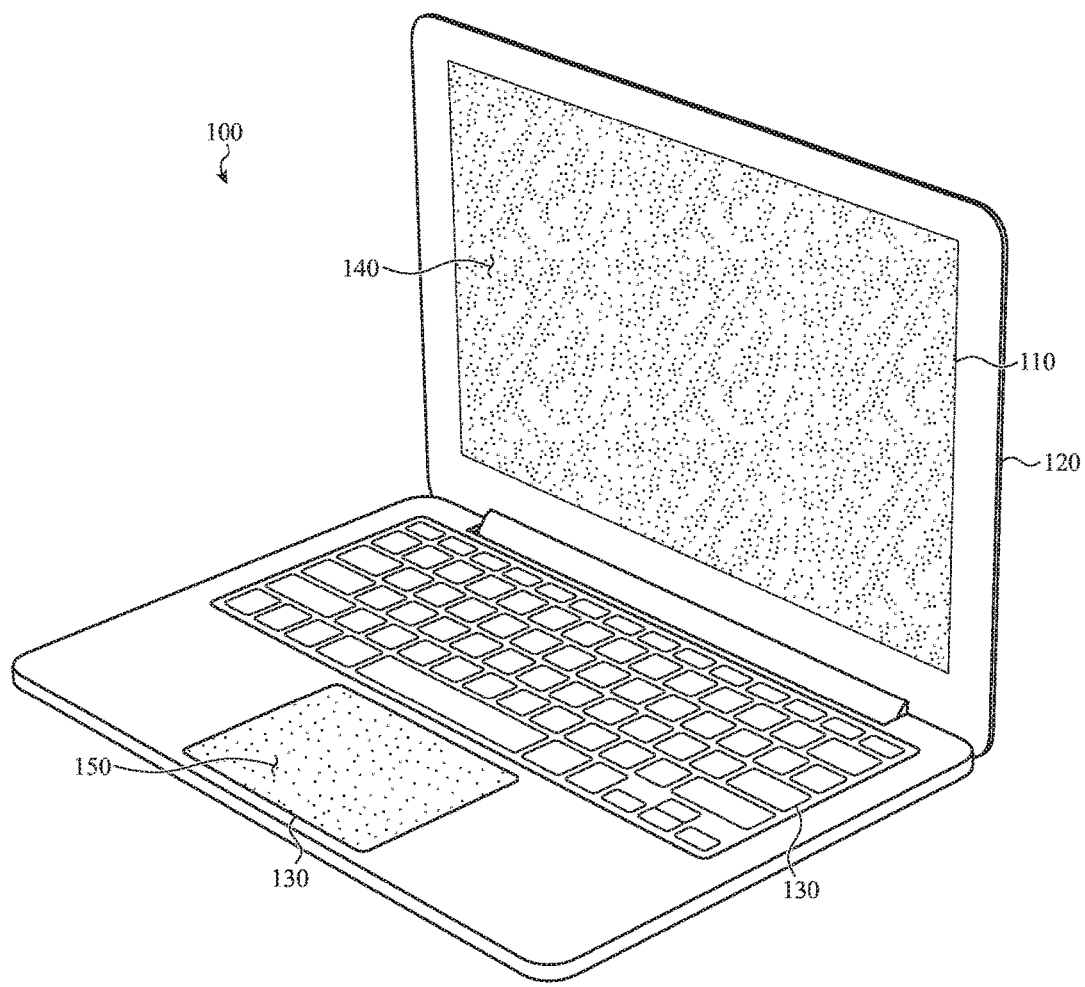
FIG. 1B illustrates another example electronic device that may use or incorporate the textured substrate described herein.

FIG. 1B illustrates another example electronic device 100 that may use or incorporate a textured substrate 110. As shown in FIG. 1B, this example electronic device 100 may be a laptop computer. Like the example electronic device 100 shown in FIG. 1A, this example electronic device 100 includes a textured substrate 110 surrounded (or at least partially surrounded) by a housing 120. The textured substrate 110 may be used as a protective cover and/or an input surface for a display of the electronic device 100.

The electronic device 100 may also include one or more input components 130. The input components 130 may include keys of a keyboard, a trackpad, a mouse and so on. In some embodiments, the textured substrate 110 may also be used as a cover, a surface or other part of the input components 130. For example, the textured substrate 110 may be used as a protective cover or an input surface for a trackpad.

In some embodiments, and as shown in FIG. 1B, a first component of the electronic device 100 (e.g., a display) may have a first texture pattern 140 while a second component of the electronic device 100 (e.g., an input component 130) may have a second texture pattern 150.

Although a tablet computing device and a laptop computer are specifically shown and described, the textured substrate 110 may be used in a variety of devices including desktop computers, mobile phones, monitors, televisions, wearable electronic devices, portable music players, portable gaming systems, and so on. In addition, the textured substrate 110 may be used as a window, a mirror, a cover for table, a desk, and so on. In some embodiments, substrate may be a metal or alloy. As such, when textured, the substrate may be used as a housing 120 of the electronic device 100.

However, in some embodiments, the roughness values Ra, Rq and Rz described above may vary from device to device. More specifically, the roughness of a texture may be dependent or otherwise correlate with a pixel density of a display. Thus, if the display of a particular electronic device has a high pixel density, a textured substrate 110 with a high density of peaks and valleys may be used as a protective cover for the display. The higher density of the peaks and valleys when compared with the high pixel density causes less light to be diffused by the peaks and valleys as the light passes through the textured substrate 110. This results is less haze. Likewise, when the display for a particular electronic device has a lower pixel density, a textured substrate 110 with a lower density of peaks and valleys may be used as a protective cover for the display device.

In some embodiments, haze may also be dependent on the pixel density. For example, in displays with a higher pixel density, the haze may be more noticeable. As such, the textured substrate 110 correspondingly may have low haze. Conversely, in displays with a lower pixel density, higher haze of the textured substrate 110 may have little or no visual impact on the display.

Figure 3A:
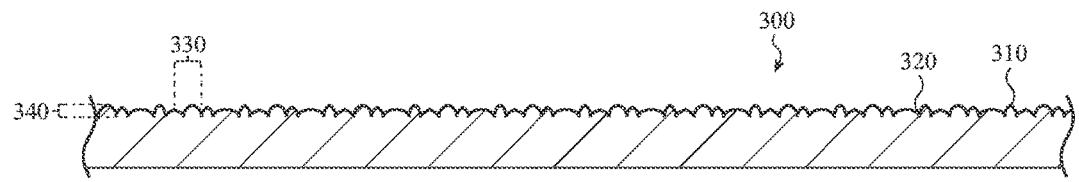
FIG. 3A illustrates an enlarged cross-section view of a textured substrate.

FIG. 3A illustrates an enlarged cross-section view of a textured substrate 300. The texture on the textured substrate 300 is representative. The texture may include an irregular arrangement of peaks and valleys. In other embodiments, the arrangement of the peaks and valleys may be regular or semi-regular. In addition, the textured substrate, or different portions of a textured substrate, may have different Ra, Rq and Rz values. The textured substrate 300 may be similar to the textured substrate 110 described above with respect to FIGS. 1A-1B. Accordingly, the cross-section view of the textured substrate 300 may be taken from line A-A of FIG. 1A.

The textured substrate 300 may include a pattern of peaks 310 and valleys 320. The pattern may be a random pattern or semi-random pattern. Although FIG. 3A (and FIGS. 3B-3C) show the peaks 310 and the valleys 320 of the texture, this is for example purposes only. Further, the peaks 310 and the valleys 320 are not to scale.

The peaks 310 and the valleys 320 may be formed on the textured substrate 300 by an etching process. The etching process may be a gas etching process in which a gas (or a vapor) is applied to a substrate. Once the gas is applied to the substrate, the gas reacts with the substrate to create the texture. In some embodiments, the gas used in the gas etching process is hydrogen fluoride gas although other gasses or vapors may be used.

As described above, the roughness of the textured substrate 300 may be expressed as an average roughness (Ra), as a root means square roughness (Rq), and/or as a mean roughness depth (Rz). Each of these values may be used individually, or collectively, to define the roughness of the textured substrate 300.

The average roughness (Ra) is calculated by measuring an average height 330 between the peaks 310 and the valleys 320 of the surface texture from a mean line measured within a sampling length. As described above, the average roughness of the textured substrate 300 is approximately 3 nm to approximately 15 nm, although other values may be used.

The root means square roughness (Rq) is the root means square of the average height 330 between the peaks 310 and the valleys 320 of the surface texture from a mean line measured within a sampling length. The root means squared roughness of the textured substrate 300 is approximately 4 nm to approximately 30 nm, although other values may be used.

The mean roughness depth (Rz) is calculated by measuring the vertical distance 340 from the highest peak 310 to the lowest valley 320 within a sampling length. The mean roughness depth of the textured substrate 300 is approximately 50 nm to approximately 170 nm, although other values may be used.

The roughness values of the textured substrate 300 described above may also be correlated with a haze. The haze may negatively affect the quality of an image and/or the quality of light as it passes through the textured substrate 300. In general, the rougher the surface of the textured substrate 300, the more light diffuses when passing through the substrate. When the textured substrate 300 is used as a protective cover for a display device, a large amount of diffusion may block or otherwise obscure images on the display.

In addition, if the peaks 310 and the valleys 320 of the texture are the same size, or have a similar size, to one or more pixels of the display device, a "sparkling" effect may occur. More specifically, as a viewing angle changes, some of the pixels of the display device may appear brighter than other pixels of the display device. This also creates an undesired visual effect.

However, using the roughness values for Ra, Rq, and Rz described above, any haze caused by the texture does not exceed approximately 0.7 percent of the visible light that passes through the textured substrate 300. Any sparkling effect that may otherwise be present is also reduced, and may not be perceptible by a human eye or is otherwise eliminated.

Each of the roughness values described above may cause the textured substrate 300 to exhibit a first coefficient of friction when a first object contacts or otherwise moves across the surface of the textured substrate 300, and a second coefficient of friction when a second object contacts or otherwise moves across the surface of the textured substrate 300. Each coefficient of friction may cause the user to perceive different tactile sensations.

Figure 3B:
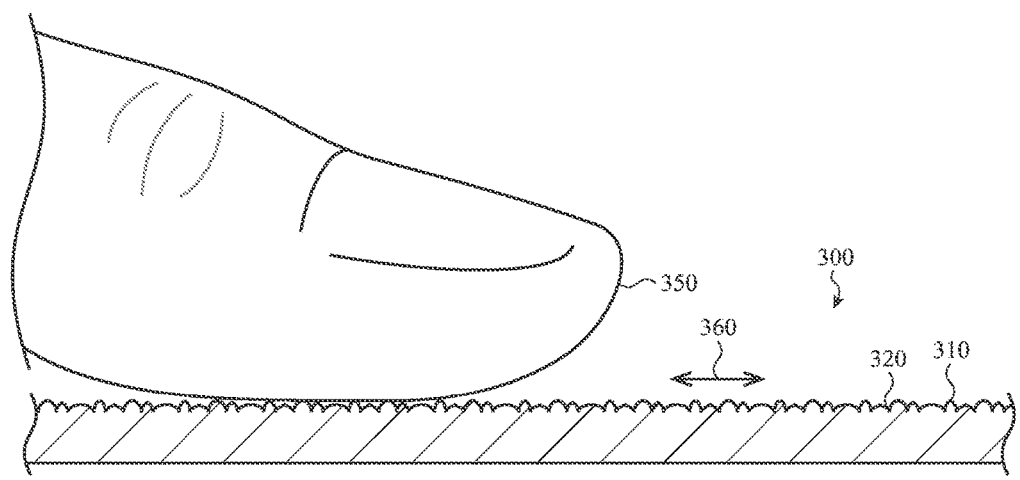
FIG. 3B illustrates the enlarged cross-section view of the textured substrate of FIG. 3A in contact with a user's finger.

For example, and referring to FIG. 3B, a user may contact the surface of the textured substrate 300 with her finger 350. As the user moves her finger 350 across the textured substrate 300, for example, in the direction of arrow 360, the textured substrate 300 may exhibit a first coefficient of friction. As a result, the user may perceive a first tactile sensation. In one example, the first tactile sensation may be a smooth sensation.

For example, although the textured substrate 300 includes many peaks 310 and valleys 320, the relatively large surface area of the user's finger 350, when compared to the spacing between the peaks 310 and valleys 320, causes the finger 350 to contact multiples peaks 310 simultaneously. Because multiple peaks 310 are contacted simultaneously, any pressure that may be applied by the peaks 310 to the user's finger 350 is spread out along the entire contact surface area of the finger 350. As a result, the textured substrate 300 may feel smooth as the user interacts with the textured substrate 300.

Figure 3C:
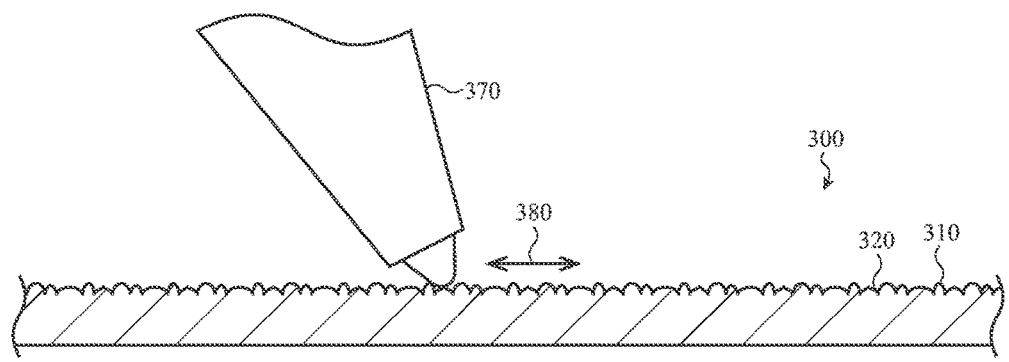
FIG. 3C illustrates the enlarged cross-section view of the textured substrate of FIG. 3A in contact with an input mechanism.

Continuing with the example and referring to FIG. 3C, a user may also contact the surface of the textured substrate 300 with an input mechanism 370. In some embodiments, the input mechanism 370 is a stylus. As the input mechanism 370 moves across the surface of the textured substrate 300, for example, in the direction of arrow 380, the textured substrate 300 may exhibit a second coefficient of friction that is different from the first coefficient of friction. As a result, the user may perceive a second tactile sensation that is different from the first tactile sensation. In one example, the tactile sensation may be a rough sensation or otherwise feel like the input mechanism 370 has an increased drag when compared to the drag exhibited by the user's finger 350.

As shown in FIG. 3C, the input mechanism 370 may have a smaller contact surface area when compared to the user's finger 350. As such, the tip of the input mechanism 370 may interact with one (or more) of the peaks 310 and the valleys 320 of the texture as is moves across the textured substrate 300. For example, the smaller surface area of the input mechanism 370 may travel over and/or through each peak 310 and valley 320 of the textured substrate 300 as it moves across the surface. As the input mechanism 370 interacts with the peaks 310 and valleys 320 in this manner, a tactile sensation (e.g., a rough sensation and/or a drag sensation) is perceived by the user.

Figure 4:
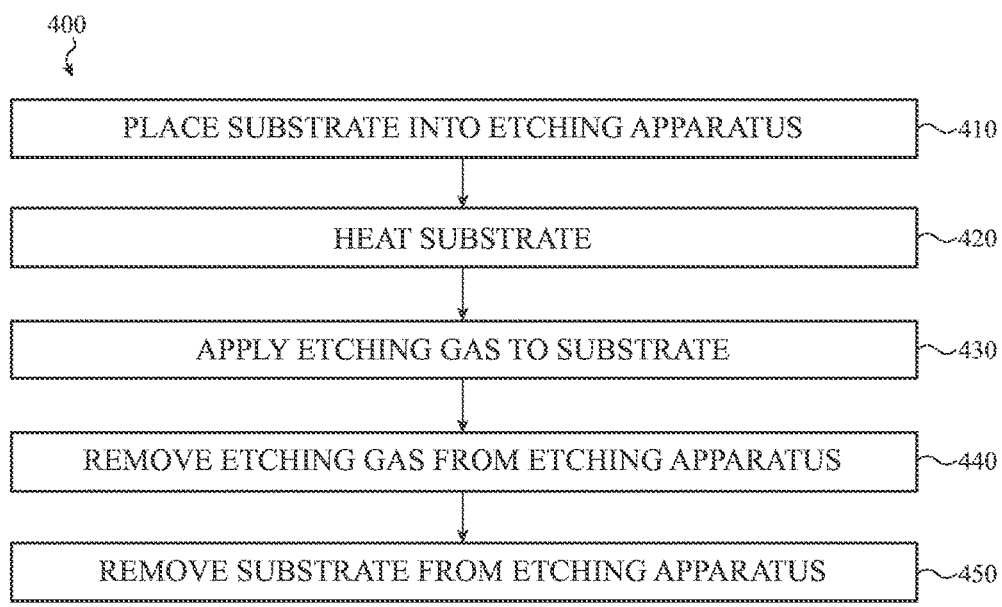
FIG. 4 illustrates a method for producing a textured substrate.

FIG. 4 illustrates a method 400 for manufacturing a textured substrate. The method 400 described herein may be used to create the textured substrate 110 described above with respect to FIGS. 1A-1B or the textured substrate 300 described above with respect to FIGS. 3A-3C.

As described above, the etching process may be a gas etching process in which hydrogen fluoride gas is used as an etching agent. Accordingly, method 400 begins at operation 410 in which a substrate is placed into an etching apparatus. The substrate may be any substantially transparent, translucent, or substantially opaque material such as, for example, glass, plastic, sapphire and so on. As such, the substrate may be a protective covering for a display device of an electronic device, a touch input device for an electronic device and so on. In other implementations, the substrate may be a metal or alloy. In such implementations, the substrate may be used as a housing or other protective cover for an electronic device, a mechanical device, or other such object.

The etching apparatus may include a single chamber that both heats the substrate and permits the etching gas to contact the surface of the substrate in order to form the texture. In another embodiment, separate heating and etching chambers may be used. In still other embodiments, a first apparatus may heat the substrate and a second apparatus may be used to apply the etching gas.

Once the substrate has been placed into the etching apparatus, flow proceeds to operation 420 and the substrate is heated. In some embodiments, the substrate may be heated to between approximately 300 degrees Fahrenheit and approximately 400 degrees Fahrenheit. In other embodiments, the substrate may be heated to between approximately 400 degrees Fahrenheit and approximately 500 degrees Fahrenheit. In still yet other embodiments, the substrate may be heated to between approximately 500 degrees Fahrenheit and approximately 600 degrees Fahrenheit. Although specific ranges have been given, the substrate may be heated above or below the approximated temperatures depending on the application.

Flow then proceeds to operation 430 and the etching gas is applied to the heated substrate. As the etching gas contacts the substrate, a chemical reaction occurs on the surface of the substrate and creates a randomized pattern of peaks and valleys. In some embodiments, the roughness values described above may be dependent or otherwise correlated with the amount of time the substrate is exposed to the etching gas and/or the temperature of the substrate when the etching gas is applied to its surface.

Once the substrate has been exposed to the etching gas for a desired amount of time, the etching apparatus removes 440 the etching gas from the chamber. Once all of the etching gas has been removed from the chamber, the substrate is removed 450 from the etching apparatus.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a touch interface, comprising:
a textured substrate comprising a glass sheet with an etched surface defined by a plurality of texture features that protrude from and are unitary with the glass sheet, the etched surface having a roughness that exhibits a first coefficient of friction when a first object moves across a surface of the textured substrate and a second coefficient of friction when a second object moves across the surface of the textured substrate, the second coefficient of friction being different from the first coefficient of friction, the roughness of the etched surface having an average roughness in a range of 3 nm to 15 nm.

2. The electronic device of claim 1, wherein the second coefficient of friction is greater than the first coefficient of friction.

3. The electronic device of claim 1, wherein the first object is a finger of a user.

4. The electronic device of claim 1, wherein the second object is a mechanical input device.

5. The electronic device of claim 1, wherein a density of the roughness is associated with a pixel density of a display associated with the touch interface.

6. A substrate for a touch input surface of an electronic device, comprising:
a unitary glass member defining an etched surface, the etched surface comprising:
a plurality of peaks; and
a plurality of valleys; wherein
a mean roughness depth between respective ones of the plurality of peaks and respective ones of the plurality of valleys is in a range of 50 nm to 170 nm; and
an average roughness of the etched surface is in a range of 3 nm to 15 nm.

7. The substrate of claim 6, wherein a root means square roughness of the etched surface is in a range of 4 nm to 20 nm.

8. The substrate of claim 6, wherein the etched surface has a first coefficient of friction with a first object and has a second coefficient of friction with a second object.

9. The substrate of claim 6, wherein the plurality of peaks and the plurality of valleys are visually imperceptible.

10. The substrate of claim 6, wherein a first portion of the etched surface has a first roughness and a second portion of the etched surface has a second roughness.

11. The substrate of claim 6, wherein a haze caused by the plurality of peaks and the plurality of valleys is less than 0.7 percent of visible light that passes through the substrate.

12. A glass substrate, comprising:
a randomized texture pattern etched along an exposed surface of the glass substrate, the randomized texture pattern comprising:
an average roughness in a range of 3 nm to 15 nm;
a root means square roughness in a range of 4 nm to 20 nm; and
a mean roughness depth in a range of 50 nm to 170 nm.

13. The glass substrate of claim 12, wherein the glass substrate is substantially transparent.

14. The glass substrate of claim 12, wherein the randomized texture pattern is visually imperceptible.

15. The glass substrate of claim 12, wherein a first region of the glass substrate comprises the randomized texture pattern and a second region of the glass substrate comprises a different randomized texture pattern.

16. The glass substrate of claim 15, wherein the randomized texture pattern has a first roughness and the different randomized texture pattern has a second roughness that is different from the first roughness.

17. The glass substrate of claim 12, wherein the glass substrate is a cover of an input mechanism for an electronic device.

18. The glass substrate of claim 12, wherein the glass substrate is a housing for an electronic device.

19. The electronic device of claim 1, wherein:
   the electronic device is a laptop computer; and
   the textured substrate defines a touch-input surface for the laptop computer.

20. The electronic device of claim 1, further comprising a display viewable through the textured substrate.

* * * * *